United States Patent
McAllister et al.

(10) Patent No.: US 8,060,783 B2
(45) Date of Patent: Nov. 15, 2011

(54) DISTRIBUTED RUNTIME DIAGNOSTICS IN HIERARCHICAL PARALLEL ENVIRONMENTS

(75) Inventors: Jeffrey S. McAllister, Rochester, MN (US); Timothy J. Mullins, Blaine, MN (US); Nelson Ramirez, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 12/389,926

(22) Filed: Feb. 20, 2009

(65) Prior Publication Data

US 2010/0218045 A1 Aug. 26, 2010

(51) Int. Cl.
G06F 11/00 (2006.01)
(52) U.S. Cl. .......................................... 714/31
(58) Field of Classification Search ....... 714/31
See application file for complete search history.

(56) References Cited

U.S. PATENT DOCUMENTS

| | | | |
|---|---|---|---|
| 4,873,656 A * | 10/1989 | Catlin | 703/16 |
| 4,916,647 A * | 4/1990 | Catlin | 703/16 |
| 5,448,722 A * | 9/1995 | Lynne et al. | 706/49 |
| 5,463,766 A | 10/1995 | Schieve et al. | |
| 5,537,653 A * | 7/1996 | Bianchini, Jr. | 714/25 |
| 5,581,695 A | 12/1996 | Knoke et al. | |
| 5,664,095 A * | 9/1997 | Cox et al. | 714/47 |
| 5,845,310 A * | 12/1998 | Brooks | 711/3 |
| 6,601,183 B1 * | 7/2003 | Larson et al. | 714/4 |
| 6,708,291 B1 * | 3/2004 | Kidder | 714/39 |
| 6,918,059 B1 * | 7/2005 | Galuten et al. | 714/31 |
| 6,931,576 B2 | 8/2005 | Morrison et al. | |
| 6,983,362 B1 * | 1/2006 | Kidder et al. | 713/1 |
| 6,988,055 B1 * | 1/2006 | Rhea et al. | 702/186 |
| 7,058,927 B2 | 6/2006 | Yenne et al. | |
| 7,200,775 B1 * | 4/2007 | Rhea et al. | 714/27 |
| 7,231,549 B1 * | 6/2007 | Rhea et al. | 714/25 |
| 2005/0081191 A1 | 4/2005 | Pomaranski et al. | |
| 2005/0097397 A1 * | 5/2005 | Wu | 714/31 |
| 2007/0180322 A1 | 8/2007 | Todoroki et al. | |

FOREIGN PATENT DOCUMENTS

KR 1020000041888 A 7/2000

OTHER PUBLICATIONS http://publib.boulder.ibm.com/infocenter/clresctr/vxrx/index.jsp?topic=/com.ibm.cluster.pe__linux43.opuse.doc/am102__dishconsole.html, "Using the Dish Console", printed Mar. 28, 2011.
Alden Dima, http://www.infoloom.com/gcaconfs/WEB/philadelphia99/dima.HTM, "Using XML in a Software Diagnostic Tool", Dec. 1999, printed Mar. 28, 2011.

(Continued)

Primary Examiner — Amine Riad
(74) Attorney, Agent, or Firm — Patterson & Sheridan, LLP; Grant A. Johnson

(57) ABSTRACT

A technique is disclosed for distributed runtime diagnostics in hierarchical parallel environments. In one embodiment, a user is allowed to configure, during runtime, a processing element on which to perform diagnostics, an algorithm for the processing element to execute, a data set for the algorithm to execute against, a diagnostic function for the processing element to execute, a condition for executing the diagnostic function, and visualization parameters for memory local to the processing element. As a result, runtime diagnostics can be performed with sufficient degree of control and customization to aid debugging in a hierarchical parallel environment.

22 Claims, 6 Drawing Sheets

OTHER PUBLICATIONS

Jay Fenlason, http://www.cs.utah.edu/dept/old/textinfo/as/gprof.html, 'GNU gprof, printed Mar. 28, 2011, Copyright 1988, 1992.

http://www.metaswitch.com/nbase/diagnostics.aspx?dcredir=true, "Diagnostics", printed Mar. 28, 2011.

IBM, "Data Communication and Synchronization Library for Cell Broadband Engine Programmers Guide and API Reference", SC33-8407-11, 2007, printed from http://moss.csc.ncsu.edu/~mueller/cluster/ps3/SDK3.0/docs/lib/DaCS_Prog_Guide_API_v3.0.pdf.

* cited by examiner

DISTRIBUTED RUNTIME DIAGNOSTICS IN HIERARCHICAL PARALLEL ENVIRONMENTS

BACKGROUND OF THE INVENTION

1. Field of the Invention

Embodiments of the invention generally relate to debugging tools. More specifically, embodiments of the invention relate to a debugging tool for distributed runtime diagnostics in hierarchical parallel environments.

2. Description of the Related Art

In software systems that process data across a wide array of heterogeneous processing elements, the various communication layers may not necessarily provide guarantees of data integrity. An example of such a software system is a distributed parallel application that includes parts executing on multiple x86 processors and parts executing on multiple Cell BE processors. A software developer may have created a complex distributed application that passed unit tests. When the distributed application executes, however, the data returned may differ slightly from expected results.

In such scenarios, identifying the cause of such a data anomaly across a distributed heterogeneous landscape may be very difficult. The cause may be a software bug, a hardware failure, or a design flaw. This poses challenges to ensuring data integrity, to ensuring software system integrity, to performance analysis, and to fast, efficient development of hierarchical parallel software.

SUMMARY OF THE INVENTION

One embodiment of the invention includes a method for performing distributed runtime diagnostics in a hierarchical parallel environment containing a plurality of processing elements. The method may generally include receiving user input specifying at least a first processing element of the hierarchical parallel environment for diagnostics; receiving user input specifying an algorithm for the first processing element to execute using a set of data; receiving user input specifying a condition, wherein the condition specifies when, during the algorithm, to execute the diagnostic function; transmitting, to the first processing element, the specified algorithm, the set of data, the diagnostic function, and the specified condition; and invoking the diagnostic function on the first processing element when the condition is satisfied.

Another embodiment of the invention includes a computer-readable storage medium containing a program which, when executed, performs an operation for performing distributed runtime diagnostics in a hierarchical parallel environment containing a plurality of processing elements. The operation may generally include receiving user input specifying at least a first processing element of the hierarchical parallel environment for diagnostics; receiving user input specifying an algorithm for the first processing element to execute using a set of data; receiving user input specifying a condition, wherein the condition specifies when, during the algorithm, to execute the diagnostic function; transmitting, to the first processing element, the specified algorithm, the set of data, the diagnostic function, and the specified condition; and invoking the diagnostic function on the first processing element when the condition is satisfied.

Still another embodiment of the invention includes a system having a processor and a memory containing a program, which when executed by the processor is configured to perform an operation for performing distributed runtime diagnostics in a hierarchical parallel environment containing a plurality of processing elements. The operation should generally include receiving user input specifying at least a first processing element of the hierarchical parallel environment for diagnostics; receiving user input specifying an algorithm for the first processing element to execute using a set of data; receiving user input specifying a condition, wherein the condition specifies when, during the algorithm, to execute the diagnostic function; transmitting, to the first processing element, the specified algorithm, the set of data, the diagnostic function, and the specified condition; and invoking the diagnostic function on the first processing element when the condition is satisfied.

Still another embodiment of the invention includes a computer-implemented method for performing distributed runtime diagnostics in a computing environment which includes a hierarchy of processing elements including at least a main processing element and a plurality of subordinate processing element. This method may generally include invoking, by the main processing element, executable code on one or more of the subordinate processing elements. The executable code on at least a first one of the one or more subordinate processing elements is instrumented to invoke a diagnostic function when specified conditions are satisfied. The method may further include invoking the diagnostic function, via the instrumented executable code, during execution of the executable code on the first subordinate processing element, on the subordinate processing element when the conditions are satisfied. The method may further include storing, by the first subordinate processing element, a result obtained from invoking the diagnostic function in a dedicated region of memory local to the first subordinate processing element. And also include reporting, by the first subordinate processing element, the result to the main processing element.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
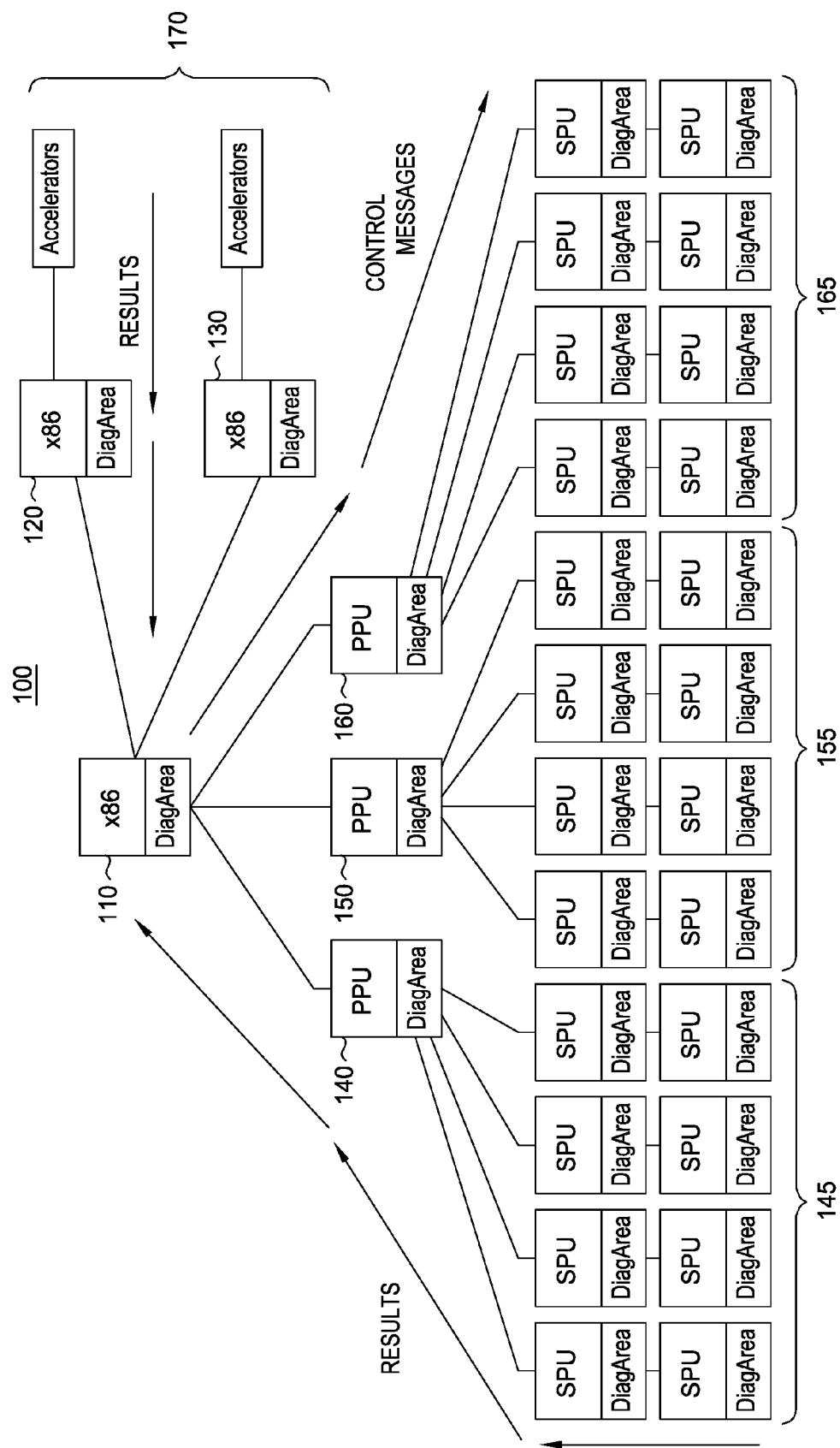
FIG. 1 illustrates a processor view of a hierarchical parallel environment, according to one embodiment of the invention.

Accordingly, embodiments of the invention provide techniques to identify a source of a data anomaly or application malfunction across a hierarchical parallel environment. For example, embodiments provide a software developer control over how distributed runtime diagnostics are performed in a hierarchical parallel environment. Further, embodiments of the invention allow a software developer to control distributed runtime diagnostics, from both a processing element view and from a detailed low level code view. Further, embodiments of the invention provide a high degree of control over runtime information that can be gathered about a distributed parallel heterogeneous application. In particular, developers may control test cases, data, time at which the tests are performed, and what processing elements execute a test case. Controlling the test case involves controlling the specific diagnostic activity that takes place, such as storing the program counter every millisecond or applying a hash to an array in a local memory. In addition, the software developer may incorporate prior knowledge of data being processed as part of a given test design. Further, the software designer may control when the diagnostic code executes and which set of processing elements execute the diagnostic code. Finally, for visualization, the software designer may control what and when data results are returned through the hierarchy to be visualized. In this manner, the software developer can delve into the hierarchy and obtain information for a specific set of data and from a specific time and processing location. Further, the software developer may control the performance characteristics of processing elements during runtime.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

In the following, reference is made to a Cell BE computer that includes a power processor element (PPE) having a processor (PPU) and its L1 and L2 caches. Each Cell BE computer also includes multiple synergistic processor elements (SPEs) that each provide a synergistic processor unit (SPU) and local store as well as a high bandwidth internal element interconnect bus (EIB). Although the figures herein are described in conjunction with a Cell BE computer, embodiments of the invention may be readily adapted for use with other processor architectures.

FIG. 1 is illustrates a processor view of a computing environment, according to one embodiment of the invention. As shown, the computing environment 100 includes a plurality of processing elements. The processing elements include a master processing element 110 of a first computer, an x86 processing element 120 of a second computer, an x86 processing element 130 of a third computer, a Cell BE PPU 140 and SPUs 145 of a fourth computer, a Cell BE PPU 150 and SPUs 155 of a fifth computer, a Cell BE PPU 160 and SPUs 165 of a sixth computer, and accelerators 170 (such as a graphics processing unit) for two x86 processing elements 120,130.

In one embodiment, the master processing element 110 conducts distributed runtime diagnostics in the hierarchical parallel environment 100. As shown, the processing elements 120, 130, 140, 145, 150, 155, 160, 165 receive control messages (represented using arrows) from the master processing element 110. The processing elements 120, 130, 140, 145, 150, 155, 160, 165 pass results to the master processing element 110 (represented using arrows). Each processing element 110, 120, 130, 140, 145, 150, 155, 160, 165 allocates an area of local memory for use by runtime diagnostics code. This area of local memory is referred to herein as the "DiagArea."

Figure 2:
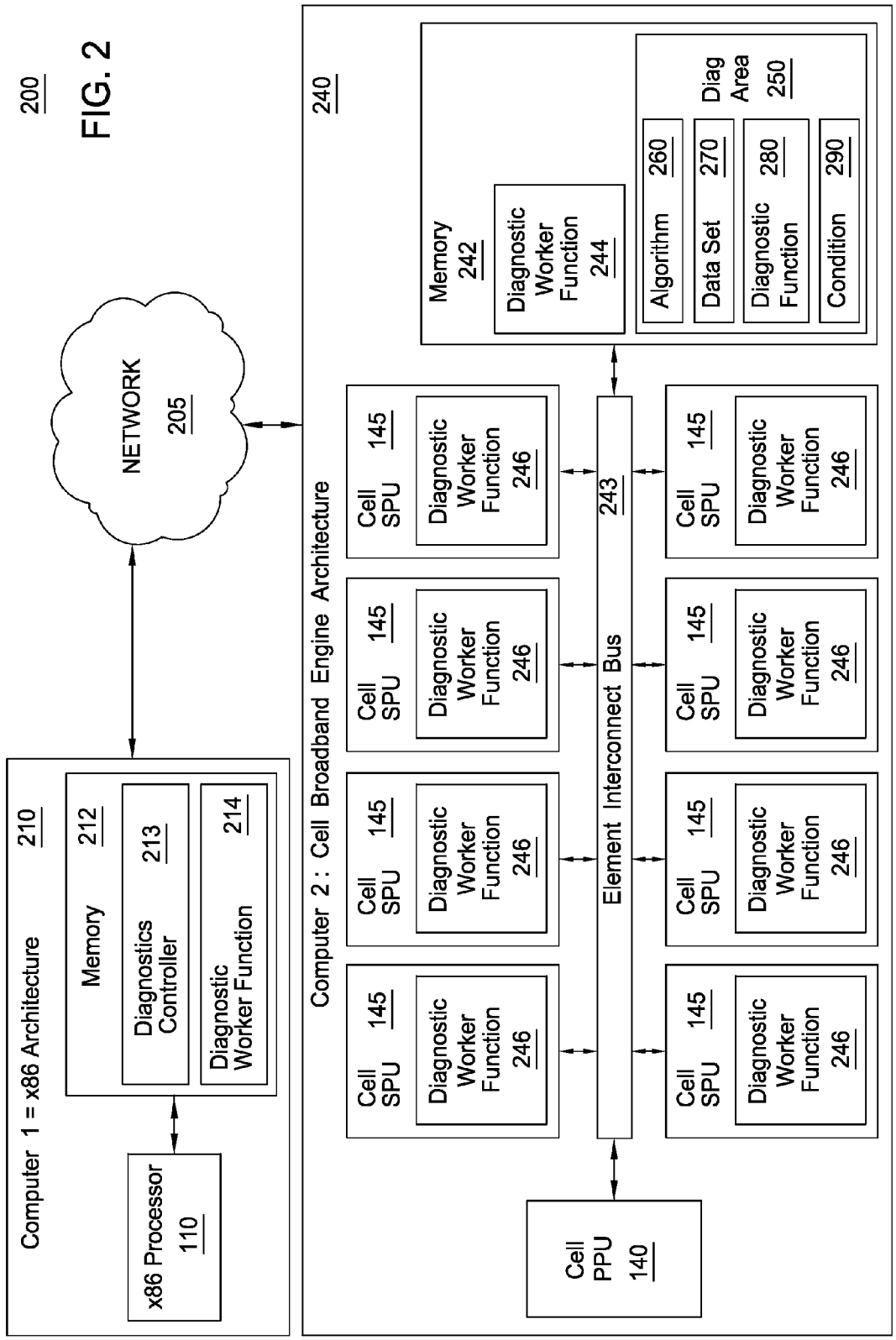
FIG. 2 illustrates a structural view of a hierarchical parallel environment, according to one embodiment of the invention.

FIG. 2 illustrates a structural view of a computing environment 200 containing the x86 master processing element 110 and the Cell BE PPU 140 and SPUs 145 of FIG. 1, according to one embodiment of the invention. As shown, an x86 computer 210 includes the x86 processor 110, a memory 212, and storage. Further, a Cell BE computer 240 includes the Cell PPU 140, eight Cell SPUs 145, an Element Interconnect Bus 243, a memory 242, and a storage (not shown). Generally, each computer 210, 240 includes one or more processors 110,140,145 which obtain instructions and data from a memory 212, 242 and any storage devices (e.g., a hard-drive, flash memory, or a computer readable storage medium such as a CD or DVD-ROM). Each processor 110, 140, 145 is a programmable logic device that performs instructions, logic, and mathematical processing. Additionally, the computers 210, 240 may include storage, e.g., hard-disk drives, flash memory devices, optical media and the like. The computers 210, 240 are operably connected to a network 205. The memory 212, 242 includes a diagnostic worker function 214, 244 and an operating system. An operating system is the software used for managing the operation of computers 210, 240. Examples of operating systems include UNIX, a version of the Microsoft Windows® operating system, and distributions of the Linux® operating system. (Note: Linux is a trademark of Linus Torvalds in the United States and other countries.)

As shown, the memory 212 stores a diagnostics controller 213. The diagnostics controller 213 may provide a software application configured to execute on a master processing element and control aspects of distributed runtime diagnostics, according to one embodiment. In particular, the diagnostics controller 213 controls what (and when) diagnostic activity occurs on lower level processing elements of the hierarchy. Each Cell SPU 145 may also include a local memory storing a diagnostic worker function 246.

Note, however, the computer systems illustrated in computing environment 200 may include existing computer systems, e.g., desktop computers, server computers, laptop computers, tablet computers, and the like. The computing environment 200 illustrated in FIG. 2, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 2 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, master processing element 110 executes diagnostics controller 213. The diagnostics controller 213 controls what diagnostic activity occurs on lower level processing elements of the hierarchy. Each processing element 110, 140, 145 executes an image instrumented with a diagnostic worker function 214, 244, 246 to allow (i) initial setup by the master processing element 110 and (ii) subsequent communication with the master processing element 110. Each processing element 110,140,145 may be configured to receive specific messages that activate the associated diagnostic worker function 214, 244, 246 to allow control of distributed runtime diagnostics.

In one embodiment, master processing element 110 loads an executable image instrumented with a diagnostic worker function 214, 24, 246 into the local memory 212, 242 of each processing element 110,140,145. The diagnostic worker function 214, 244, 246 includes a startup routine configured to allocate a dedicated region in the local memory 212, 242 of each processing element 110, 140, 145. In FIG. 2, this dedicated region is shown in the memory 242 as DiagArea 250. In one embodiment, the DiagArea 250 is reserved for use by runtime diagnostics. After allocating the dedicated memory region, the diagnostic worker function 214, 244, 246 may enter a suspended state. In the suspended state, the diagnostic worker function 214, 244, 246 remains inactive until the processing element 110, 140, 145 receives a wake-up message to cause the diagnostic worker function 214, 244, 246 to resume execution.

Figure 3:
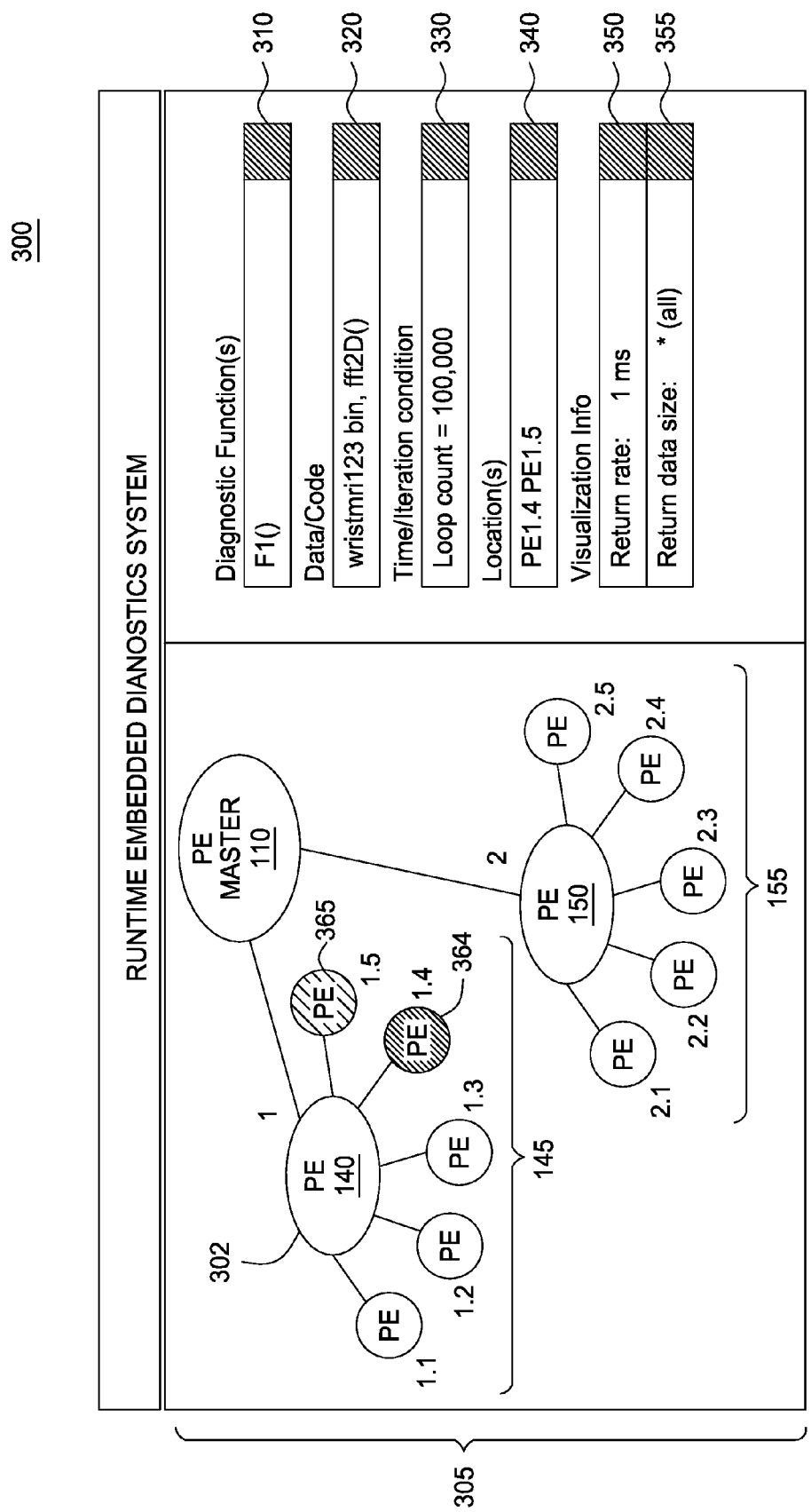
FIG. 3 illustrates a graphical user interface for performing distributed runtime diagnostics in a hierarchical parallel environment, according to one embodiment of the invention.

In one embodiment, the diagnostics controller 213 provides a graphical user interface for performing distributed runtime diagnostics. FIG. 3 illustrates a graphical user interface 300 for performing distributed runtime diagnostics in a hierarchical parallel environment, according to one embodiment of the invention. As shown, the graphical user interface 300 allows a user to configure how distributed runtime diagnostics are performed for a parallel environment 302 represented by a visualization window 305. The hierarchical parallel environment 302 generally corresponds to the computing environment 100 of FIG. 1. Illustratively, the graphical user interface 300 includes diagnostic function input 310, data/code input 320, condition input 330, location input 340, visualization parameters, and the visualization window 305. Visualization parameters may include a visualization data rate input 350 and a visualization data size input 355.

As shown, the visualization window 305 displays a topology of the hierarchical parallel environment 302 on which distributed runtime diagnostics are being performed. The topology includes the master processing element 110 and processing elements 140, 145, 150, 155. As shown, the visualization window 305 includes a visual indication that runtime diagnostics are being performed on two processing elements 364, 365 (i.e., the two processing elements are shaded in this example). The visualization window 305 also includes a visual indication that runtime diagnostics have detected an error in the data of a processing element 364 (indicated in this example by the shading of processing element 364.

In one embodiment, the diagnostic function input 310 receives user input specifying a diagnostic function to execute. The executable code for the diagnostic function may be loaded dynamically via control messages sent by the diagnostics controller 213. The user may specify the file from which to load the diagnostic function F1( ) via a file navigator, for example. As shown, an "F1( ) function" is specified as using the diagnostic function input 310. The F1( ) function may compute a checksum, such as a hash. For example, a diagnostic function may be a function calculateCRC(start_address, end_address) that calculates a cyclic redundancy check (CRC) of an area of local memory from addresses start_address to end_address. As a further example, a diagnostic function may be a function calculateMessageCount (messageID), which runs whenever the processing element receives a message from the master processing element and updates a counter in the DiagArea 250. Of course, the function F1( ) may be configured to perform a variety of diagnostic functions. Further, each processing element may execute a different diagnostic function (e.g., F1( ), F2( ), F3( ), etc.).

In one embodiment, the user may control whether results are immediately returned, saved until the diagnostic function completes execution, sent after a specified time interval, or sent upon the occurrence of a specified event. Using such functionality, the user may gather both performance metrics and data validity metrics.

The data/code input 320 receives user input specifying an algorithm to execute and data set for the algorithm to execute against. As shown, fft2D( ) (i.e., a two-dimensional fast Fourier transform algorithm) is specified to be the algorithm to execute, and wristmri123.bin is specified to be the file containing the data set for fft2D( ) to execute against. In one embodiment, data at known data-dependent checkpoints can be precomputed by running the algorithm in an environment containing only a single processing element. The precomputed data may then be used to check the validity of data computed within the distributed heterogeneous system. For example, for fft2D( ), given a data set, a set of checksums may be precomputed and used as validation keys in a distributed heterogeneous environment.

The condition input 330 receives user input specifying a condition. The condition, in turn, specifies when, during execution of the specified algorithm, to execute the specified diagnostic function. As shown, the condition "Loop count=100,000" is specified. That is, the diagnostic function F1( ) is invoked during execution of the one-hundred-thousandth iteration of a loop in the algorithm fft2D( ) running against the data set wristmri123.bin. Other examples include a condition that invokes the diagnostic function F1( ) once every 10 minutes, a condition that invokes the diagnostic function F1( ) based on a specific value of a program counter for the specified algorithm, and a condition that invokes the diagnostic function F1( ) for every input DMA (direct memory access) of the local memory of the processing element.

The location input 340 receives user input specifying a processing element for performing runtime diagnostics. As shown, two processing elements 364, 365 are specified on which to execute the specified algorithm and specified diagnostic function. In one embodiment, a user may specify runtime diagnostics to be performed on one, multiple, or all processing elements. A visualization rate input 350 receives user input specifying a data return rate (i.e., a sampling rate) from the specified processing element to the master processing element 110 for visualization purposes. As shown, data is specified to be returned at a rate of every millisecond. A visualization data size input 355 receives user input specifying a return data size from the specified processing element to the master processing element 110 for visualization purposes. As shown, an asterisk ("*") represents a specification that the entire size of the local memory of the specified processing element is to be returned. In one embodiment, the visualization window 305 may also display data returned from the specified processing element for visualization purposes. For example, if the return data size is one hundred floating-point values, such values may be displayed in the visualization window 305.

Figure 4:
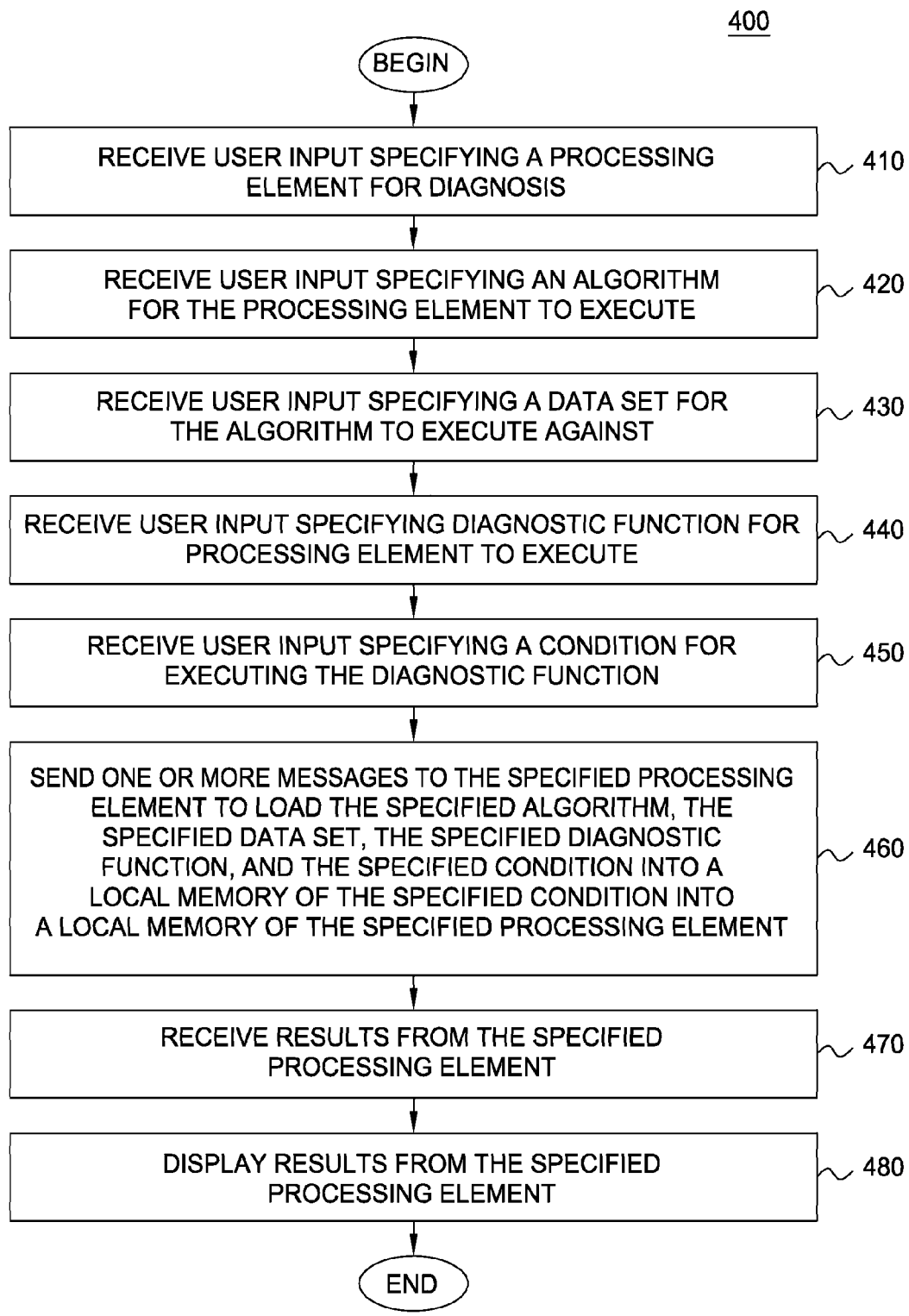
FIG. 4 is a flow diagram that illustrates a method for configuring and performing distributed runtime diagnostics by a master processing element, according to one embodiment of the invention.

FIG. 4 is a flow diagram that illustrates a method 400 for configuring and performing distributed runtime diagnostics, according to one embodiment of the invention. The method 400 begins at step 410, where the diagnostics controller 213 receives a user input specifying a processing element on which to perform diagnostics. For example, a user may interact with the visualization window 305 of FIG. 3 to specify that diagnostics should be performed on a specific processing element, e.g., the processing element 364. At step 420, the diagnostics controller 213 receives user input specifying an algorithm for the processing element to execute. For example, a user may specify that the processing element 364 should execute a fft2D( ) function (i.e., a two-dimensional fast Fourier transform algorithm). At step 430, the diagnostics controller 213 receives user input specifying a data set for the algorithm to execute against. For example, a user may specify a file containing test unit data, e.g., the "wristmri123.bin" of FIG. 3.

At step 440, the diagnostics controller 213 receives user input specifying a diagnostic function for the processing element to execute. For example, a user may interact with the visualization window 305 of FIG. 3 to specify that a specific processing element, e.g., the processing element 364, should execute F1( ) as a diagnostic function. At step 450, the diagnostics controller 213 receives user input specifying a condition for executing the diagnostic function. For example, a user may specify "Loop count=100,000" as the condition. That is, the diagnostic function should execute when the processing element is in the one-hundred-thousandth iteration of a loop in fft2D( ).

At step 460, the diagnostics controller 213 sends one or more messages to the specified processing element to load the specified algorithm, the specified data set, the specified diagnostic function, and the specified condition into a local memory of the specified processing element. At step 470, the diagnostics controller 213 receives results from the specified processing element. In one embodiment, results computed from executing the diagnostic function may also be returned to the diagnostics controller 213 for the diagnostics controller 213 to detect if an error or failure is present. At step 480, the diagnostics controller 213 displays results from the specified processing element. After step 480, method 400 terminates.

Figure 5:
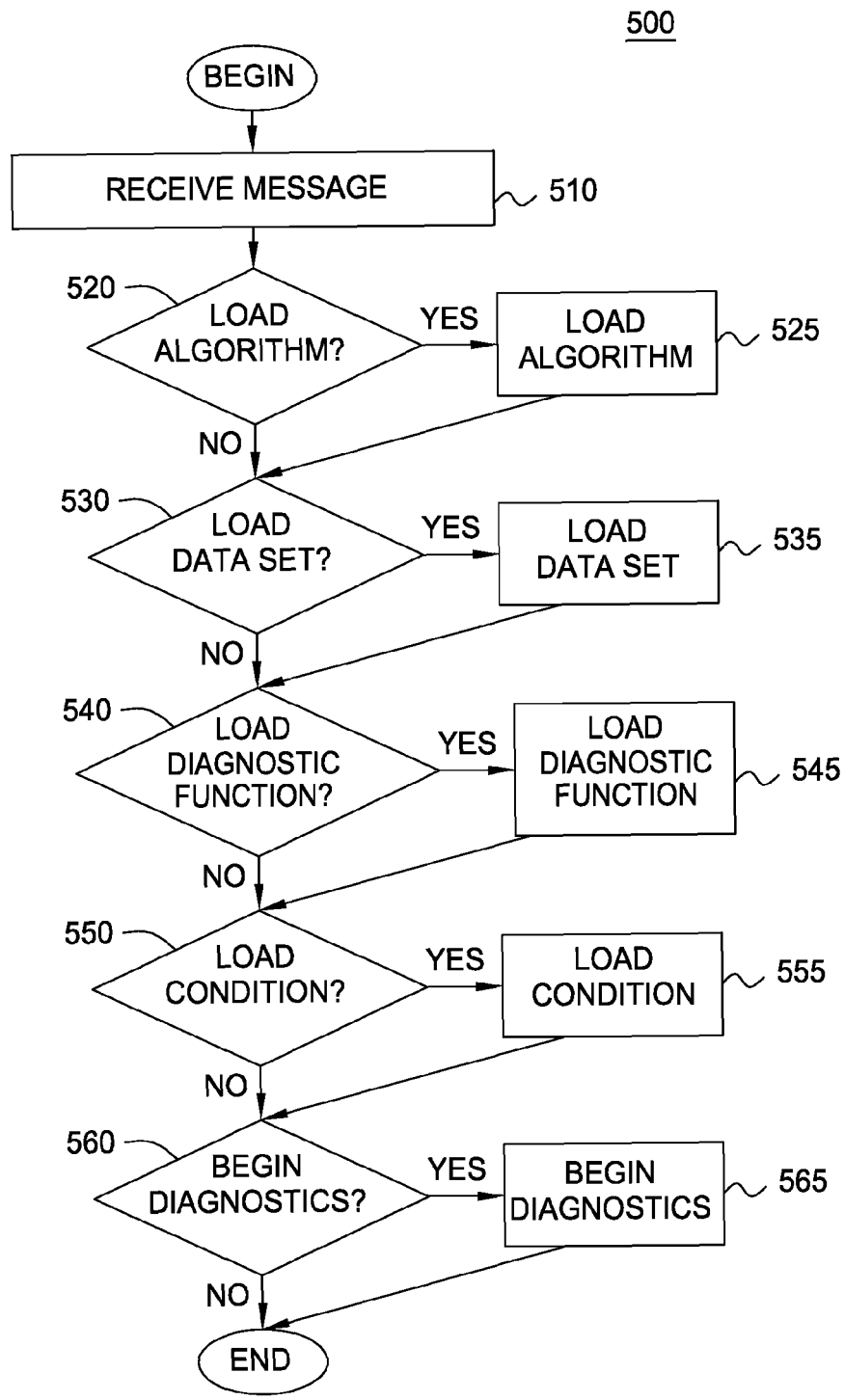
FIG. 5 is a flow diagram that illustrates a method for configuring and performing distributed runtime diagnostics on a specified processing element, according to one embodiment of the invention.

FIG. 5 is a flow diagram that illustrates a method 500 for configuring and performing distributed runtime diagnostics by the diagnostic worker function 246 on a specified processing element, according to one embodiment of the invention. The method 500 begins at step 510, where the diagnostic worker function 246 receives a message from the diagnostics controller 213. The diagnostic worker function 246 may be present on one of the processing elements of the hierarchy. For example, as described above a region of memory local to the processing element may be allocated to store the worker function. Further, the other inputs and outputs (time, data, results, etc.) generated by the diagnostic worker function may be stored in this memory region. At step 520, the diagnostic worker function 246 determines whether the message specifies an algorithm to be loaded. If so, the diagnostic worker function 246 (at step 525) loads the specified algorithm (e.g., fft2D( )) into a local memory (specifically, into the DiagArea of the local memory) before proceeding.

At step 530, the diagnostic worker function 246 determines whether the message specifies a data set to be loaded. If so, the diagnostic worker function 246 (at step 535) loads the specified data set into the local memory before proceeding. At step 540, the diagnostic worker function 246 determines whether the message specifies a diagnostic function to be loaded. If so, the diagnostic worker function 246 (at step 545) loads the specified diagnostic function (e.g., F1( )) into the local memory before proceeding.

At step 550, the diagnostic worker function 246 determines whether the message specifies a condition to be loaded. If so, the diagnostic worker function 246 (at step 555) loads the specified condition (e.g., Loop count=100,000) into the local memory before proceeding. At step 560, the diagnostic worker function 246 determines whether the message specifies that diagnostics should begin. If so, the diagnostic worker function 246 (at step 565) begins performing diagnostics. That is, the hierarchical parallel environment generally begins processing data (e.g., starts performing the fft2d( ) function using the wristmri123 data as specified by the diagnostics system, the results of executing the diagnostic worker function (e.g., the function F1( ) invoked after each 100,000 loop iterations).

Figure 6:
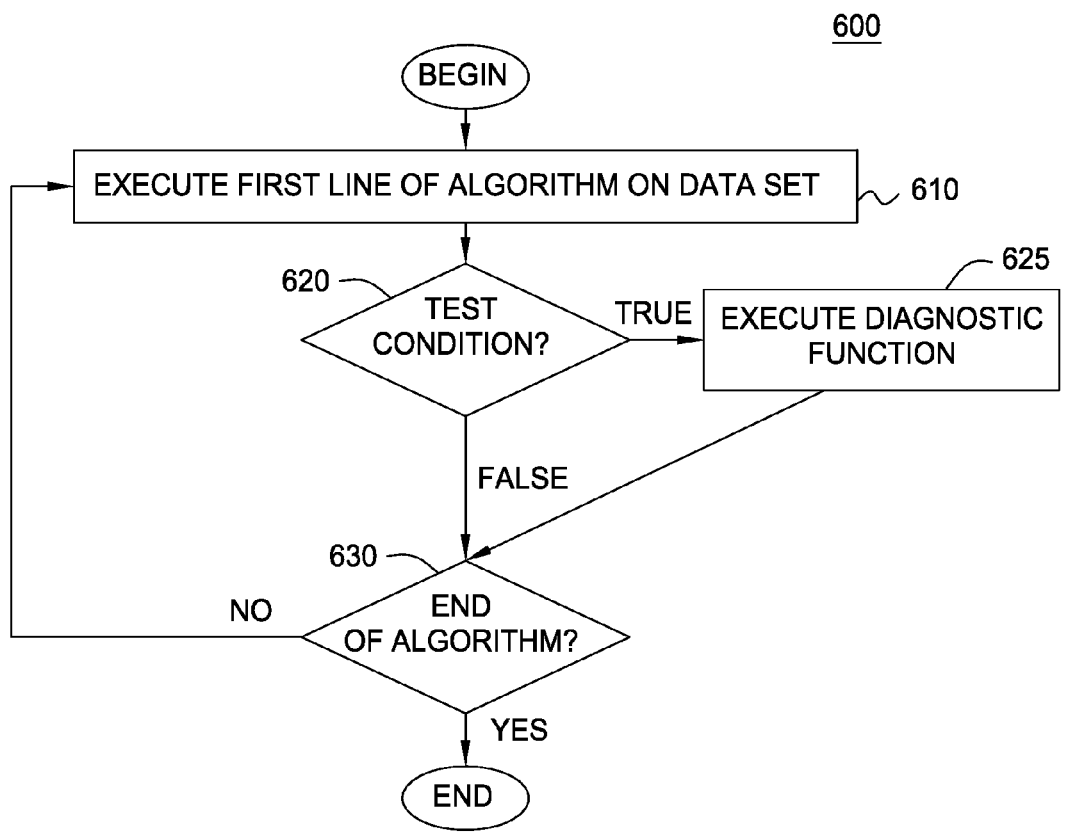
FIG. 6 is a flow diagram that illustrates a method for executing a diagnostic function on a specified processing element, according to one embodiment of the invention.

FIG. 6 is a flow diagram that illustrates a method 600 for executing a diagnostic function on a specified processing element, according to one embodiment of the invention. The method 600 begins at step 610, where the diagnostic worker function 246 executes a first line of the specified algorithm on the specified data set. For example, the diagnostic worker function 246 may execute the first line of fft2D( ) (i.e., a two-dimensional fast Fourier transform algorithm). At step 620, the diagnostic worker function 246 tests whether the specified condition is true. For example, the diagnostic worker function 246 may test whether execution is currently at the one-hundred-thousandth iteration of a loop in fft2D( ). In one embodiment, fft2D( ) may be instrumented to write values to the DiagArea 250. If so, at step 625, the diagnostic worker function 246 executes the specified diagnostic function (e.g., F1( ) is invoked). At step 630, the diagnostic worker function 246 determines whether the end of the specified algorithm was reached. If not, the diagnostic worker function 246 loops back to step 610. Otherwise, after step 630, method 600 terminates.

Of course, the embodiments described herein are intended to be illustrative and not limiting of the invention, and other embodiments are broadly contemplated. Those skilled in the art will recognize, for example, that other control messages, such as "stop executing diagnostic function", "return diagnostic info", "stop executing algorithm", etc., may be supported by embodiments of the invention. Further, diagnostic function results may be verified either by the diagnostics controller on the master processing element or by the diagnostic worker function on the specified processing element.

While the foregoing is directed to embodiments of the present invention, other and further embodiments of the invention may be devised without departing from the basic scope thereof, and the scope thereof is determined by the claims that follow.

What is claimed is:

1. A computer-implemented method for performing distributed runtime diagnostics in a hierarchical parallel environment containing a plurality of processing elements, comprising:
    receiving, at a user interface, user input specifying at least a first processing element of the hierarchical parallel environment for diagnostics;
    receiving, at the user interface, user input specifying an algorithm for the first processing element to execute using a set of data;
    receiving, at the user interface, user input specifying a condition, wherein the condition specifies when, during the algorithm, to execute the diagnostic function;
    transmitting, via a communication interface to the first processing element, the specified algorithm, the set of data, the diagnostic function, and the specified condition; and
    invoking the diagnostic function on the first processing element when the condition is satisfied.

2. The computer-implemented method of claim 1, further comprising:
    receiving user input specifying a second processing element of the hierarchical parallel environment for diagnostics;
    transmitting, to the second processing element, the specified algorithm, the set of data, a second diagnostic function, and the specified condition; and
    invoking the second diagnostic function on the second processing element when the condition is satisfied.

3. The computer-implemented method of claim 1, further comprising:
    receiving user input specifying a data size and a sampling rate; and
    displaying a visualization based on the specified data size and the specified sampling rate.

4. The computer-implemented method of claim 1, wherein the specified algorithm is instrumented with a diagnostic worker function and wherein at least one of the specified algorithm, the specified data set, and the specified diagnostic function is loaded into a memory for use by the first processing element via the message.

5. The computer-implemented method of claim 4, wherein the hierarchical parallel environment contains a master processing element, wherein the message is sent by the master processing element, and wherein the computer-implemented method further comprises:
    receiving user input specifying a data size and a sampling rate;
    returning, by the first processing element, data of the specified data size to the master processing element at the specified sampling rate; and
    displaying a visualization based on the returned data.

6. The computer-implemented method of claim 4, wherein, the diagnostic function computes a checksum.

7. The computer-implemented method of claim 1, wherein the specified condition includes at least one of a line number, a loop iteration number, a program counter, and the occurrence of an event, and wherein the diagnostic worker function allocates a region of memory local to the first processing element for storing the specified algorithm, the specified data set, the specified diagnostic function, and the specified condition.

8. A non-transitory computer readable storage medium containing a program which, when executed, performs an operation for performing distributed runtime diagnostics in a hierarchical parallel environment containing a plurality of processing elements, comprising:
    receiving user input specifying at least a first processing element of the hierarchical parallel environment for diagnostics;
    receiving user input specifying an algorithm for the first processing element to execute using a set of data;
    receiving user input specifying a condition, wherein the condition specifies when, during the algorithm, to execute the diagnostic function;
    transmitting, to the first processing element, the specified algorithm, the set of data, the diagnostic function, and the specified condition; and
    invoking the diagnostic function on the first processing element when the condition is satisfied.

9. The computer readable storage medium of claim 8, wherein the program further comprises:
    receiving user input specifying a second processing element of the hierarchical parallel environment for diagnostics;
    transmitting, to the second processing element, the specified algorithm, the set of data, the diagnostic function, and the specified condition; and
    invoking the diagnostic function on the second processing element when the condition is satisfied.

10. The computer readable storage medium of claim 8, wherein the program further comprises:
    receiving user input specifying a data size and a sampling rate for visualization purposes; and
    displaying visualization information based on the specified data size and the specified sampling rate.

11. The computer readable storage medium of claim 8, wherein the specified algorithm is instrumented with a diagnostic worker function and wherein at least one of the specified algorithm, the specified data set, and the specified diagnostic function is loaded into a memory for use by the first processing element via the message.

12. The computer readable storage medium of claim 11, wherein the hierarchical parallel environment contains a master processing element, wherein the message is sent by the master processing element, and wherein the program further comprises:

receiving user input specifying a data size and a sampling rate;

returning, by the first processing element, data of the specified data size to the master processing element at the specified sampling rate; and displaying a visualization based on the returned data.

13. The computer readable storage medium of claim 11, wherein, the diagnostic function computes a checksum.

14. The computer readable storage medium of claim 8, wherein the specified condition includes at least one of a line number, a loop iteration number, a program counter, and the occurrence of an event, and wherein the diagnostic worker function allocates a region of memory local to the first processing element for storing the specified algorithm, the specified data set, the specified diagnostic function, and the specified condition.

15. A system, comprising:

a processor; and a memory containing a program, which when executed by the processor is configured to perform an operation for performing distributed runtime diagnostics in a hierarchical parallel environment containing a plurality of processing elements, comprising:

receiving user input specifying a processing element of the hierarchical parallel environment for diagnostics;

receiving user input specifying an algorithm for the processing element to execute;

receiving user input specifying a data set for the algorithm to execute against;

receiving user input specifying a diagnostic function for the processing element to execute;

receiving user input specifying a condition, wherein the condition specifies when, during the algorithm, to execute the diagnostic function;

loading the specified algorithm, the specified data set, the specified diagnostic function, and the specified condition into a local memory of the specified processing element; and executing the specified diagnostic function on the specified processing element when the condition is satisfied.

16. The system of claim 15, wherein the program further comprises:

receiving user input specifying a second processing element of the hierarchical parallel environment for diagnostics;

transmitting, to the second processing element, the specified algorithm, the set of data, the diagnostic function, and the specified condition; and invoking the diagnostic function on the second processing element when the condition is satisfied.

17. The system of claim 15, wherein the program further comprises:

receiving user input specifying a data size and a sampling rate for visualization purposes; and displaying visualization information based on the specified data size and the specified sampling rate.

18. The system of claim 15, wherein the specified algorithm is instrumented with a diagnostic worker function and wherein at least one of the specified algorithm, the specified data set, and the specified diagnostic function is loaded into a memory for use by the first processing element via the message.

19. The system of claim 18, wherein the hierarchical parallel environment contains a master processing element, wherein the message is sent by master processing element, and wherein the program further comprises:

receiving user input specifying a data size and a sampling rate;

returning, by the first processing element, data of the specified data size to the master processing element at the specified sampling rate; and displaying a visualization based on the returned data.

20. The system of claim 18, wherein, the diagnostic function computes a checksum.

21. The system of claim 15, wherein the specified condition includes at least one of a line number, a loop iteration number, a program counter, and the occurrence of an event, and wherein the diagnostic worker function allocates a region of memory local to the first processing element for storing the specified algorithm, the specified data set, the specified diagnostic function, and the specified condition.

22. A computer-implemented method for performing distributed runtime diagnostics in a computing environment which includes a hierarchy of processing elements including at least a main processing element and a plurality of subordinate processing element, the method comprising:

invoking, by the main processing element, executable code on one or more of the subordinate processing elements, wherein the executable code on at least a first one of the one or more subordinate processing elements is instrumented to invoke a diagnostic function when specified conditions are satisfied;

invoking the diagnostic function, via the instrumented executable code, during execution of the executable code on the first subordinate processing element, on the subordinate processing element when the conditions are satisfied;

storing, by the first subordinate processing element, a result from obtained from invoking the diagnostic function in a dedicated region of memory local to the first subordinate processing element; and reporting, by the first subordinate processing element, the result to the main processing element.

* * * * *